US010798215B2

(12) United States Patent
Trossen

(10) Patent No.: US 10,798,215 B2
(45) Date of Patent: Oct. 6, 2020

(54) HTTP RESPONSE FAILOVER IN AN HTTP-OVER-ICN SCENARIO

(71) Applicant: IDAC HOLDINGS, INC., Wilmington, DE (US)

(72) Inventor: Dirk Trossen, London (GB)

(73) Assignee: IDAC Holdings, Inc., Wilmington, DE (US)

(*) Notice: Subject to any disclaimer, the term of this patent is extended or adjusted under 35 U.S.C. 154(b) by 0 days.

(21) Appl. No.: 16/340,246

(22) PCT Filed: Oct. 13, 2017

(86) PCT No.: PCT/US2017/056456
§ 371 (c)(1),
(2) Date: Apr. 8, 2019

(87) PCT Pub. No.: WO2018/071743
PCT Pub. Date: Apr. 19, 2018

(65) Prior Publication Data
US 2020/0045135 A1    Feb. 6, 2020

Related U.S. Application Data

(60) Provisional application No. 62/408,366, filed on Oct. 14, 2016.

(51) Int. Cl.
*H04L 12/70*    (2013.01)
*H04L 29/08*    (2006.01)
(Continued)

(52) U.S. Cl.
CPC ............ *H04L 67/327* (2013.01); *H04L 41/06* (2013.01); *H04L 41/12* (2013.01); *H04L 67/02* (2013.01); *H04L 67/42* (2013.01)

(58) Field of Classification Search
None
See application file for complete search history.

(56) References Cited

U.S. PATENT DOCUMENTS

| 2009/0287835 | A1  | 11/2009 | Jacobson |
| 2016/0173604 | A1* | 6/2016  | Panigrahi ............ H04L 67/2842 709/216 |
| 2018/0007116 | A1  | 1/2018  | Trossen |

FOREIGN PATENT DOCUMENTS

| EP | 2 634 991   | 9/2013  |
| EP | 2 785 017   | 10/2014 |
| WO | 2017/004508 | 1/2017  |

OTHER PUBLICATIONS

Jacobson et al., "Networking Named Content," CoNEXT Proceedings of the 5th Internet Conference on Emerging Networking Experiments and Technologies, Rome, Italy, pp. 1-12 (2009).

(Continued)

*Primary Examiner* — Cai Y Chen
(74) *Attorney, Agent, or Firm* — Volpe and Koenig, P.C.

(57) ABSTRACT

A first network access point (NAP) of an Information Centric Networking (ICN) network may receive a request for a HTTP resource from a requestor. The first NAP may request the HTTP resource from a first server associated with a fully qualified domain name (FQDN). The first NAP may receive an error message that the HTTP resource is not available. The first NAP may publish a message to a rendezvous point (RVZ) including a list of excluded node identifiers (NIDs) of one or more NAPs that have not provided the HTTP resource. The first NAP may receive a forwarding identifier (FID) of a second NAP associated with the FQDN with a NID not on the list of excluded NIDs from a topology manager (TM). The first NAP may request the HTTP resource from the second NAP. The first NAP may receive the HTTP resource is and send it to the requestor.

20 Claims, 12 Drawing Sheets

(51) Int. Cl.
*H04L 12/24* (2006.01)
*H04L 29/06* (2006.01)

(56) References Cited

OTHER PUBLICATIONS

Jokela et al., "LIPSIN: Line Speed Publish/Subscribe Inter-Networking," ACM SIGCOMM Computer Communication Review, vol. 39, No. 4, pp. 195-206 (Aug. 2009).
Trossen et al., "Designing and Realizing an Information-centric Internet," IEEE Communications Magazine, vol. 50, No. 7 (Jul. 2012).

* cited by examiner

HTTP RESPONSE FAILOVER IN AN HTTP-OVER-ICN SCENARIO

CROSS REFERENCE TO RELATED APPLICATIONS

This application is the U.S. National Stage, under 35 U.S.C. § 371, of International Application No. PCT/US2017/056456 filed Oct. 13, 2017, which claims the benefit of U.S. Provisional Application No. 62/408,366, filed Oct. 14, 2016, the content of which are hereby incorporated by reference herein.

BACKGROUND

Information Centric Networking (ICN) is an approach to evolve Internet infrastructure away from a host-centric paradigm based on perpetual connectivity and the end-to-end principle to a network architecture in which the focal point is "named information" (i.e., content or data). In ICN, data becomes independent from location, application, storage, and means of transportation, enabling in-network caching and replication. The benefits of ICN include improved efficiency, better scalability with respect to information/bandwidth demand, and better robustness in challenging communication scenarios.

SUMMARY

Embodiments include systems, methods, and apparatuses for providing a failover procedure to one or more alternative Hypertext Transfer Protocol (HTTP) sources in case of an error response in an Information Centric Networking (ICN) network. A first network access point (NAP) may receive a request for a HTTP resource from a requestor. The HTTP resource may include a fully qualified domain name (FQDN). The first NAP may request the HTTP resource from a first server associated with the FQDN. The first NAP may receive an error message that the HTTP resource is not available from the first server. The first NAP may publish a message to a rendezvous point (RVZ). The message may include a list of excluded node identifiers (NIDs) of one or more NAPs that have been previously contacted and have not provided the HTTP resource. The first NAP may receive a forwarding identifier (FID) of a second NAP from a topology manager (TM). The second NAP may be associated with a second server that is associated with the FQDN. A NID of the second NAP may not be on the list of excluded NIDs. The first NAP may request the HTTP resource from the second NAP. Once the HTTP resource is received, the first NAP may send the HTTP resource to the requestor.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
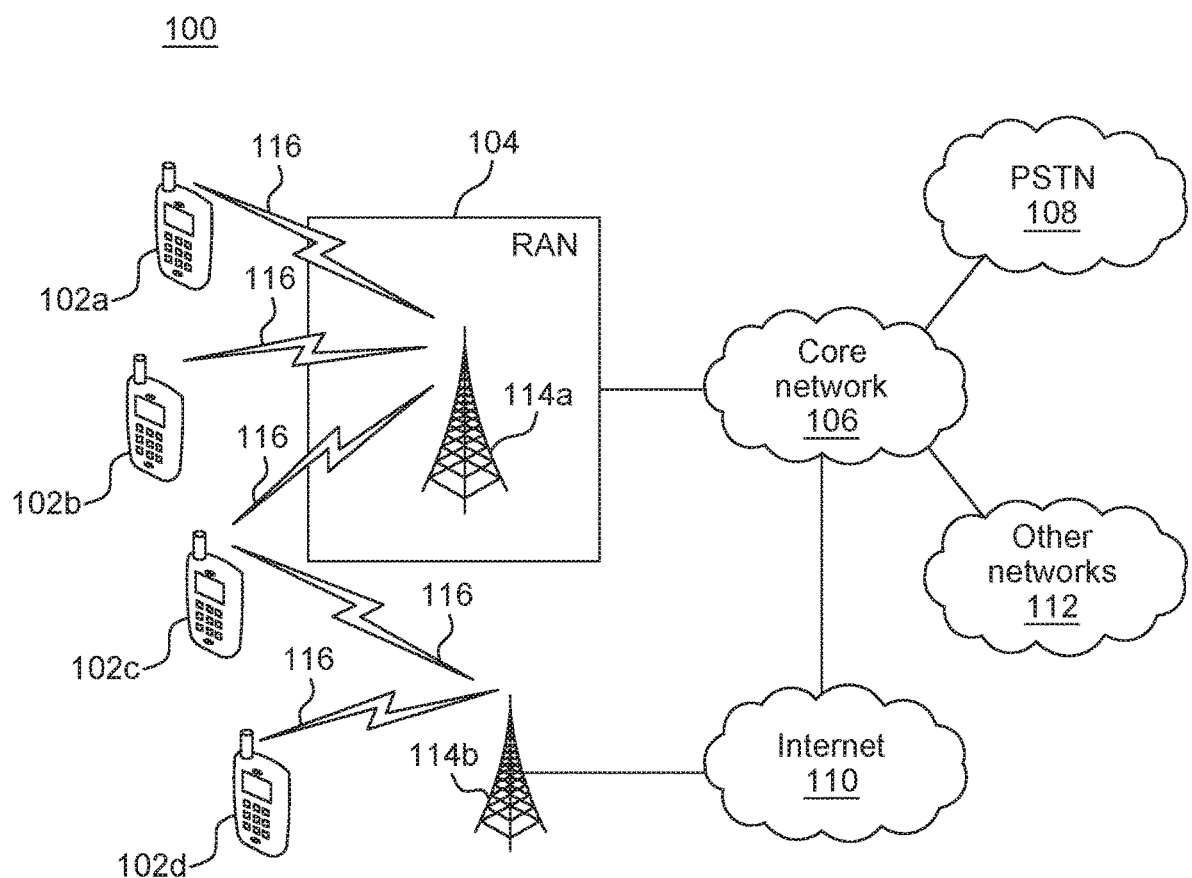
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
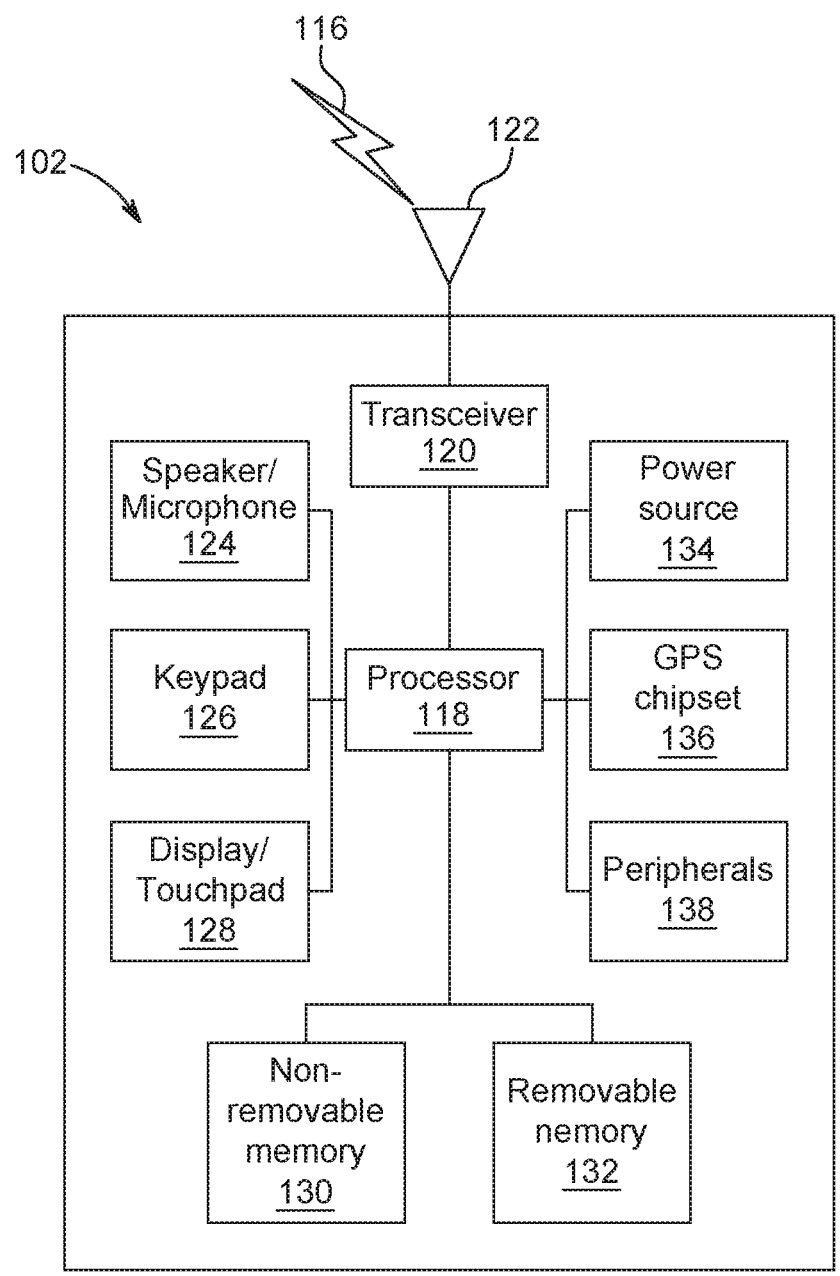
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
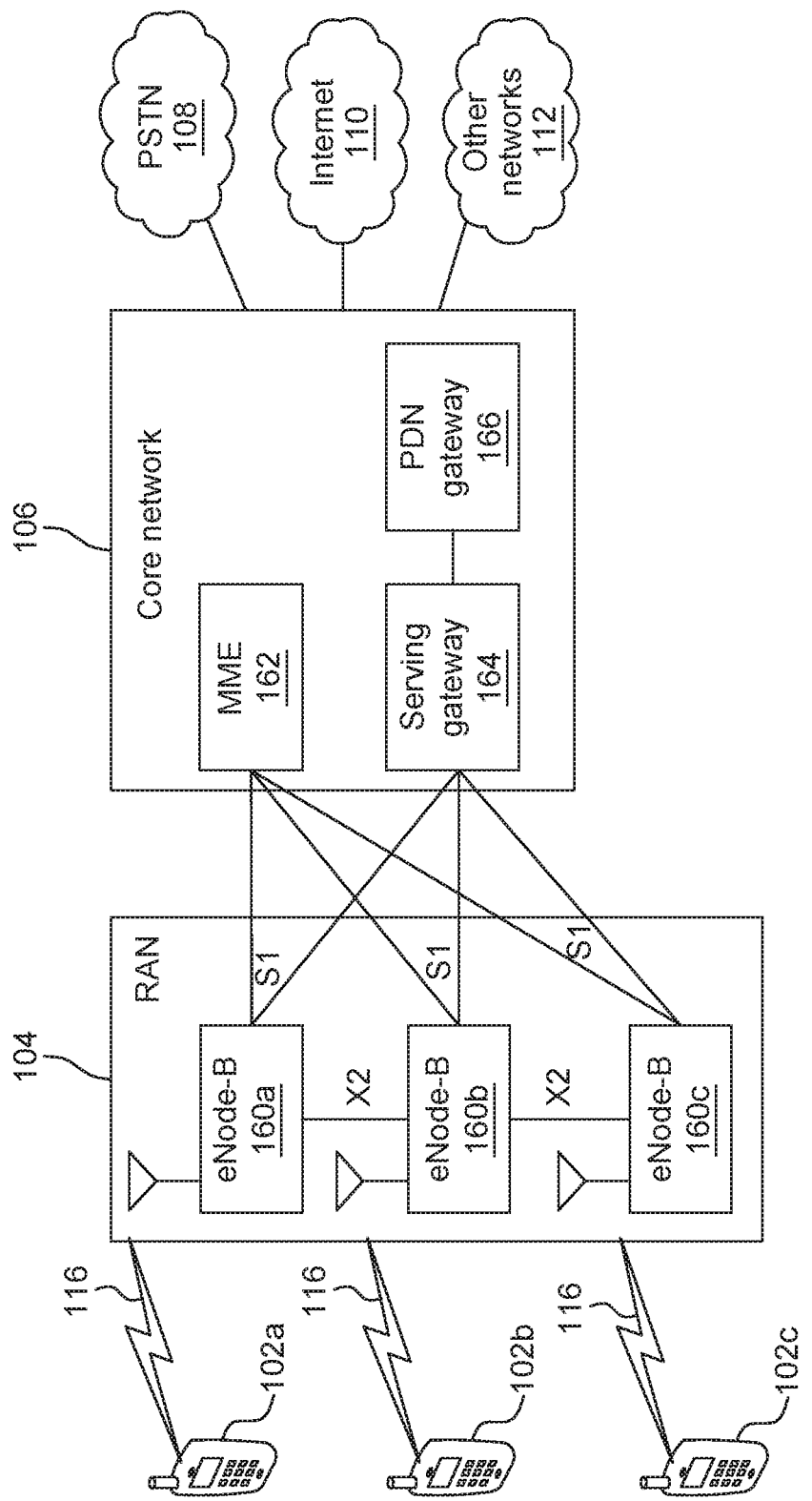
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/ detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
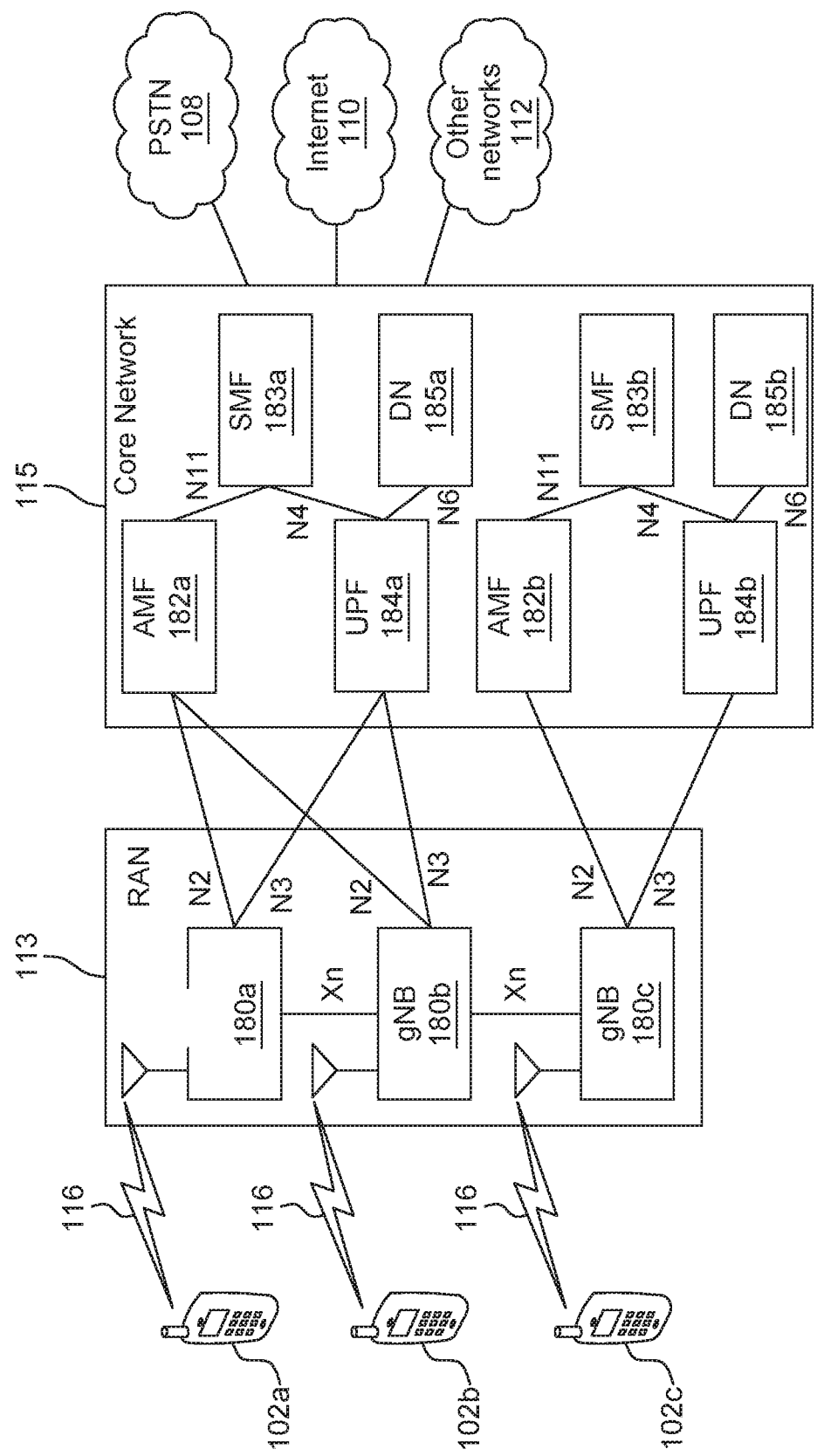
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
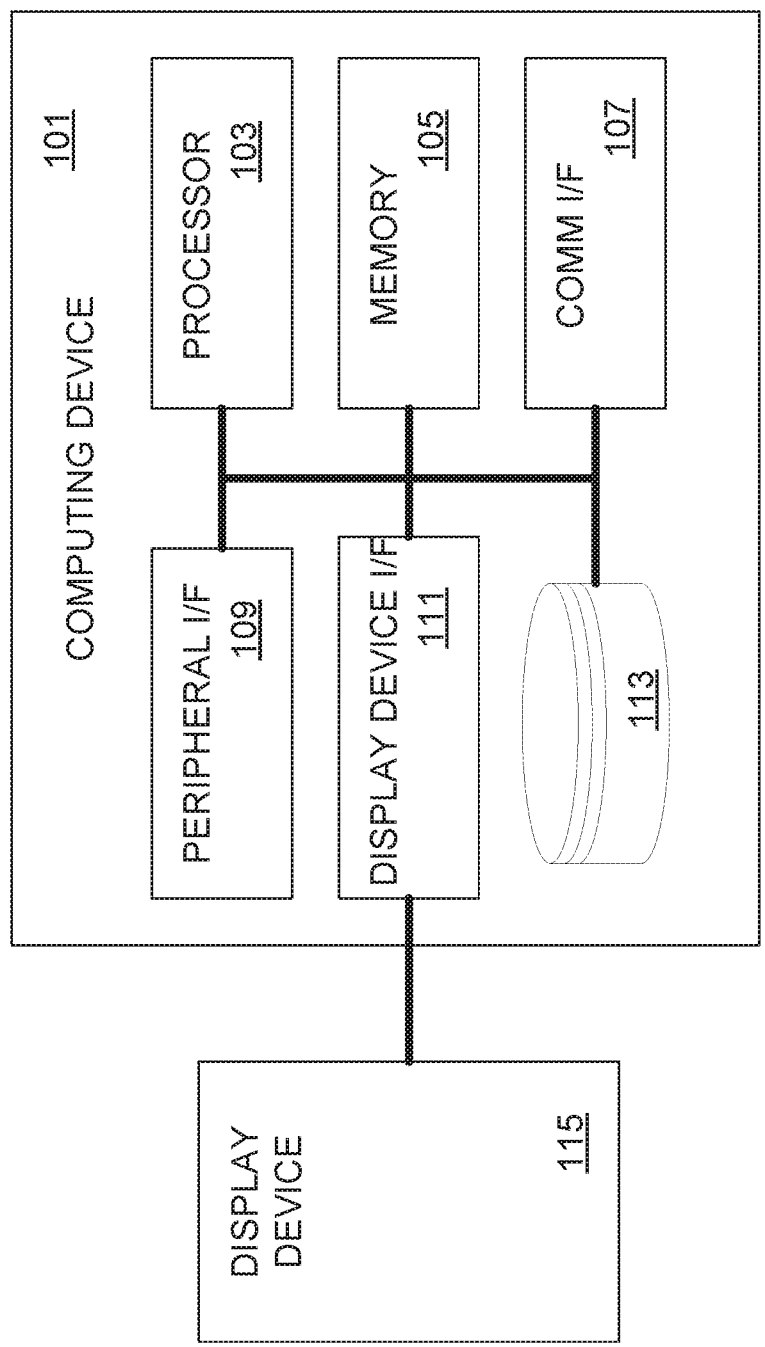
FIG. 1E is a component diagram of a computing device.

Referring now to FIG. 1E, an example computing device 101 is shown. The computing device 101 may be implemented in the clients described below. The computing device 101 may include a processor 103, a memory device 105, a communication interface 107, a peripheral device interface 109, a display device interface 111, and a storage device 113. FIG. 1E also shows a display device 115, which may be coupled to or included within the computing device 101.

The memory device 105 may be or include a device such as a Dynamic Random Access Memory (D-RAM), Static RAM (S-RAM), or other RAM or a flash memory. The storage device 113 may be or include a hard disk, a magneto-optical medium, an optical medium such as a CD-ROM, a digital versatile disk (DVDs), or Blu-Ray disc (BD), or other type of device for electronic data storage.

The communication interface 107 may be, for example, a communications port, a wired transceiver, a wireless transceiver, and/or a network card. The communication interface 107 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 109 may be an interface configured to communicate with one or more peripheral devices. The peripheral device interface 109 may operate using a technology such as Universal Serial Bus (USB), PS/2, Bluetooth, infrared, serial port, parallel port, and/or other appropriate technology. The peripheral device interface 109 may, for example, receive input data from an input device such as a keyboard, a mouse, a trackball, a touch screen, a touch pad, a stylus pad, and/or other device. Alternatively or additionally, the peripheral device interface 109 may communicate output data to a printer that is attached to the computing device 101 via the peripheral device interface 109.

The display device interface 111 may be an interface configured to communicate data to display device 115. The display device 115 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 111 may operate using technology such as Video Graphics Array (VGA), Super VGA (S-VGA), Digital Visual Interface (DVI), High-Definition Multimedia Interface (HDMI), or other appropriate technology.

The display device interface 111 may communicate display data from the processor 103 to the display device 115 for display by the display device 115. As shown in FIG. 1E, the display device 115 may be external to the computing device 101, and coupled to the computing device 101 via the display device interface 111. Alternatively, the display device 115 may be included in the computing device 101.

An instance of the computing device 101 of FIG. 1E may be configured to perform any feature or any combination of features described above. In such an instance, the memory device 105 and/or the storage device 113 may store instructions which, when executed by the processor 103, cause the processor 103 to perform any feature or any combination of features described above. Alternatively or additionally, in such an instance, each or any of the features described above may be performed by the processor 103 in conjunction with the memory device 105, communication interface 107, peripheral device interface 109, display device interface 111, and/or storage device 113.

Although FIG. 1E shows that the computing device 101 includes a single processor 103, single memory device 105, single communication interface 107, single peripheral device interface 109, single display device interface 111, and single storage device 113, the computing device may include multiples of each or any combination of these components 103, 105, 107, 109, 111, 113, and may be configured to perform, mutatis mutandis, analogous functionality to that described above.

Figure 1F:
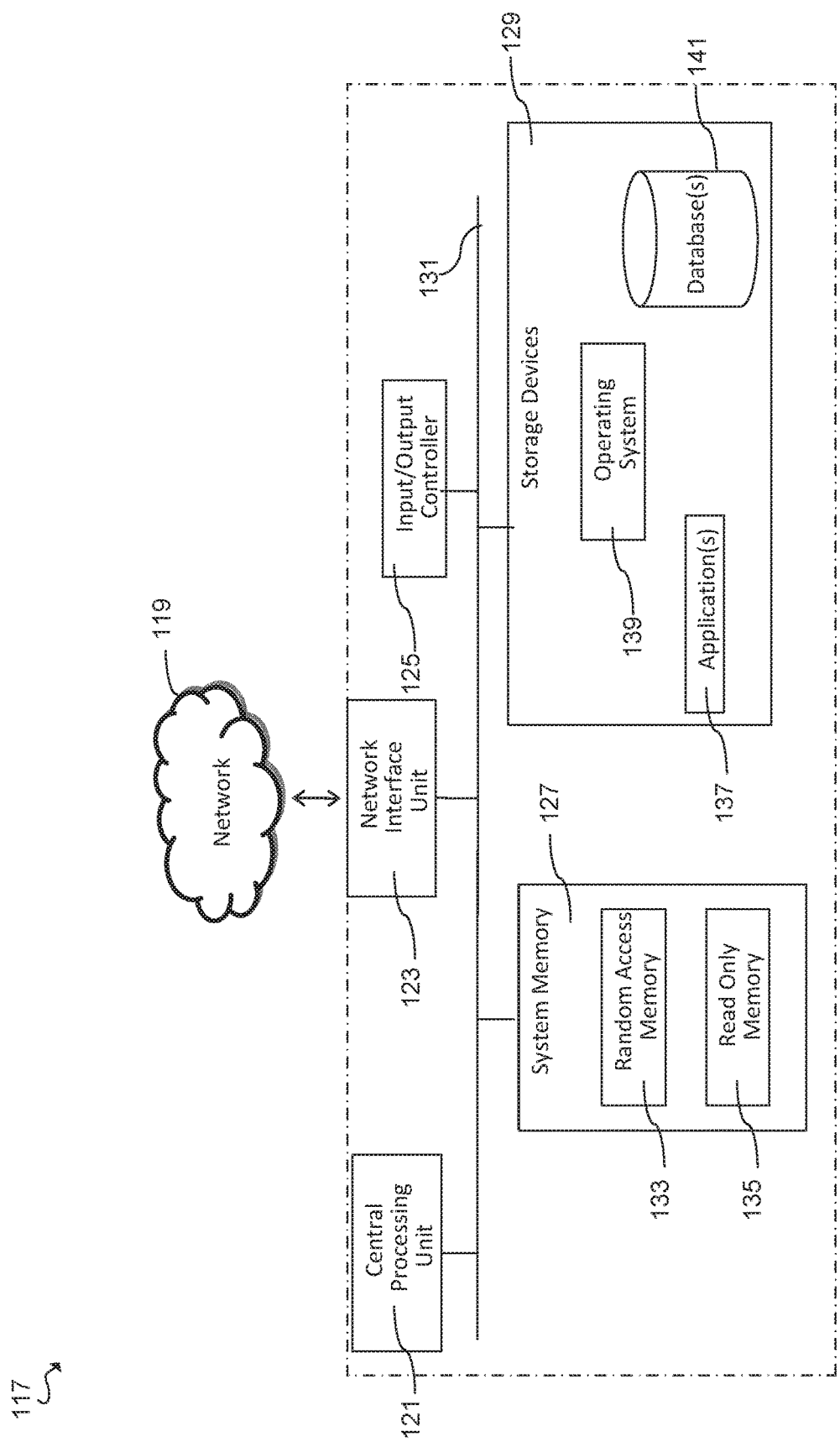
FIG. 1F is a component diagram of a server.

Referring now to FIG. 1F, a component diagram of a server 117 is shown. The server 117 may be a conventional stand-alone web server, a server system, a computing cluster, or any combination thereof. The server 117 may include a server rack, a data warehouse, network, or cloud type storage facility or mechanism that is in communication with a network 119. The server 117 may include one or more central processing units (CPU) 121, network interface units 123, input/output controllers 125, system memories 127, and storage devices 129. Each CPU 121, network interface unit 123, input/output controller 125, system memory 127, and storage devices 129 may be communicatively coupled via a bus 131.

The system memory 127 may include random access memory (RAM) 133, read only memory (ROM) 135, and one or more cache. The storage devices 129 may include one or more applications 137, an operating system 139, and one or more databases 141. The one or more databases 141 may include a relational database management system managed by Structured Query Language (SQL). The storage devices 129 may take the form of, but are not limited to, a diskette, hard drive, CD-ROM, thumb drive, hard file, or a Redundant Array of Independent Disks (RAID).

The server 117 may be accessed by the clients, as described below, via a network 119 using a mainframe, thin client, personal computer, mobile device, pad computer, or the like. Information processed by the CPU 121 and/or operated upon or stored on the storage devices 129 and/or in the system memory 127 may be displayed to a client through a user device.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Information Centric Networking (ICN) constitutes a new paradigm in which content is exchanged by means of information addressing, while appropriate networked entities that are suitable to act as a source of information are connected towards a networked entity that requested the content.

Various architectures have been proposed for ICN, each requiring a partial replacement of current Internet Protocol (IP) network infrastructure in order to realize the desired network-level functions. The new proposed architectures may be realized as an overlay over existing (e.g., IP or local Ethernet-based) architectures. Such a migration, however, may still require the transition of the WTRU to an ICN-based solution. With conventional IP-based applications providing a broad range of Internet services, the transition of all these applications may be a more difficult task than the pure transition of the network-level functionality (e.g., a protocol stack implementation) in the WTRU since it would also require the transition of server-side components (e.g., web servers). Accordingly, IP-based services and purely IP-based WTRUs may continue to exist.

The transition to ICN at the network level may provide increased efficiency through the usage of in-network caches and the spatial and/or temporal decoupling of senders and receivers and the utilization of SDN upgrades for better flow management.

A Network Access Point (NAP) may provide a standard IP network interface towards the IP-enabled device, encapsulate a received Hypertext Transfer Protocol (HTTP) request into an appropriate ICN packet which, and then publish the ICN packet as an appropriately formed named information item. The NAP may subscribe to any appropriately formed named information items, where the information identifier represents any HTTP-exposed service that is exposed at any IP-level device locally connected to the NAP. Any received ICN packet may be forwarded to the appropriate local IP device after being appropriately decapsulated, recovering the original HTTP request. An ICN border gateway (BGW) may receive ICN packets from NAPs in a network that are destined to HTTP-level service outside of the network and may forward these packets towards the appropriate IP networks. Conversely, any received HTTP request at the BGW may be forwarded to the appropriate IP-based device in its local ICN network.

Figure 2:
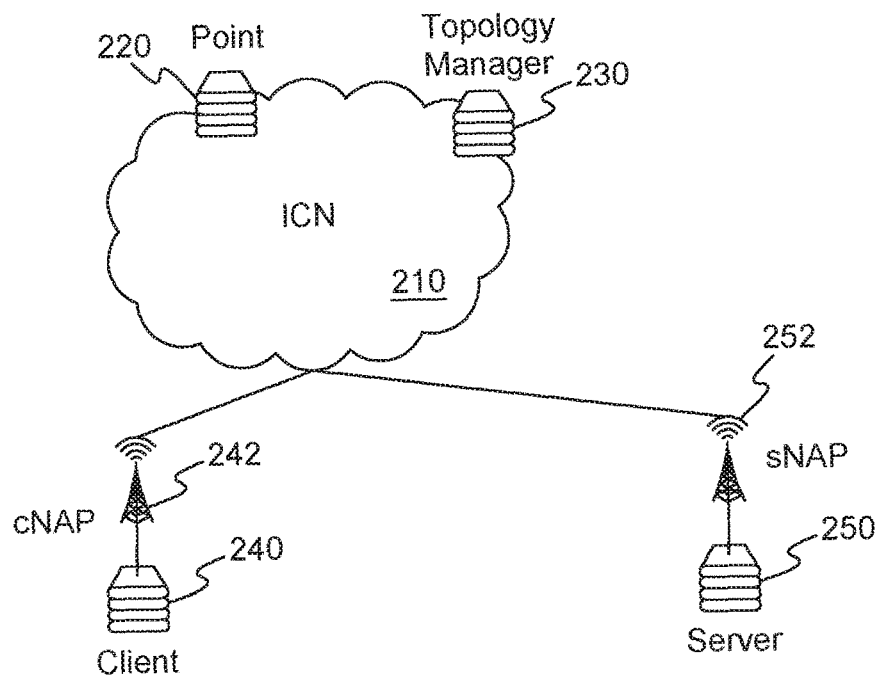
FIG. 2 is a system diagram of a conventional Information Centric Networking (ICN) network.

Referring now to FIG. 2, a system diagram of a conventional ICN network 210 is shown. The ICN network 210 may include a client 240 and a server 250. The client 240 may be an IP-enabled device, such as, for example, the WTRU 102 or the computing device 101 described above. The server 250 may be similar to the server 117 described above. The client 240 may be coupled to the ICN network 210 by a client network access point (cNAP) 242. The server 250 may be coupled to the ICN network 210 by a server network access point (sNAP) 252. The ICN network 210 may also include a rendezvous point (RVZ) 220 that allows for matching an HTTP client with a suitable server and a topology manager (TM) 230 that allows for creating a suitable forwarding path from the client 240 to the chosen server. It should be noted that the RVZ 220 and the TM 230 are shown as two logical functions, but may be implemented as a single component that combines the functions of the RVZ 220 and TM 230.

Figure 3:
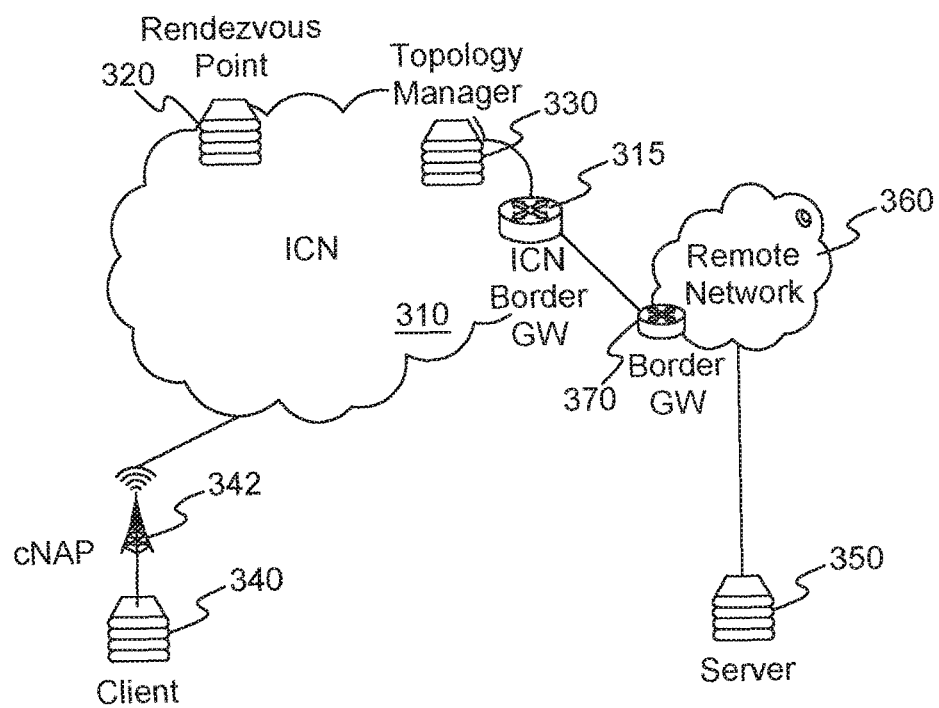
FIG. 3 is a system diagram of another conventional ICN network.

Referring now to FIG. 3, a system diagram of another conventional ICN network 310 is shown. The ICN network 310 may include a client 340 inside, or attached to, the ICN network 310 and a server 350 located outside the ICN network 310. The client 340 may be coupled to the ICN network 310 by a cNAP) 342. The ICN network 310 may include a RVZ 320 that allows for matching an HTTP client with a suitable server and a TM 330 that allows for creating a suitable forwarding path from the client 340 to the chosen server. The system of FIG. 3 may include an ICN BGW 315 coupled to the ICN network 310 and a BGW 370 coupled to a remote network 360. It should be noted that the RVZ 320 and the TM 330 are shown as two logical functions, but may be implemented as a single component that combines the functions of the RVZ 320 and TM 330.

Figure 4:
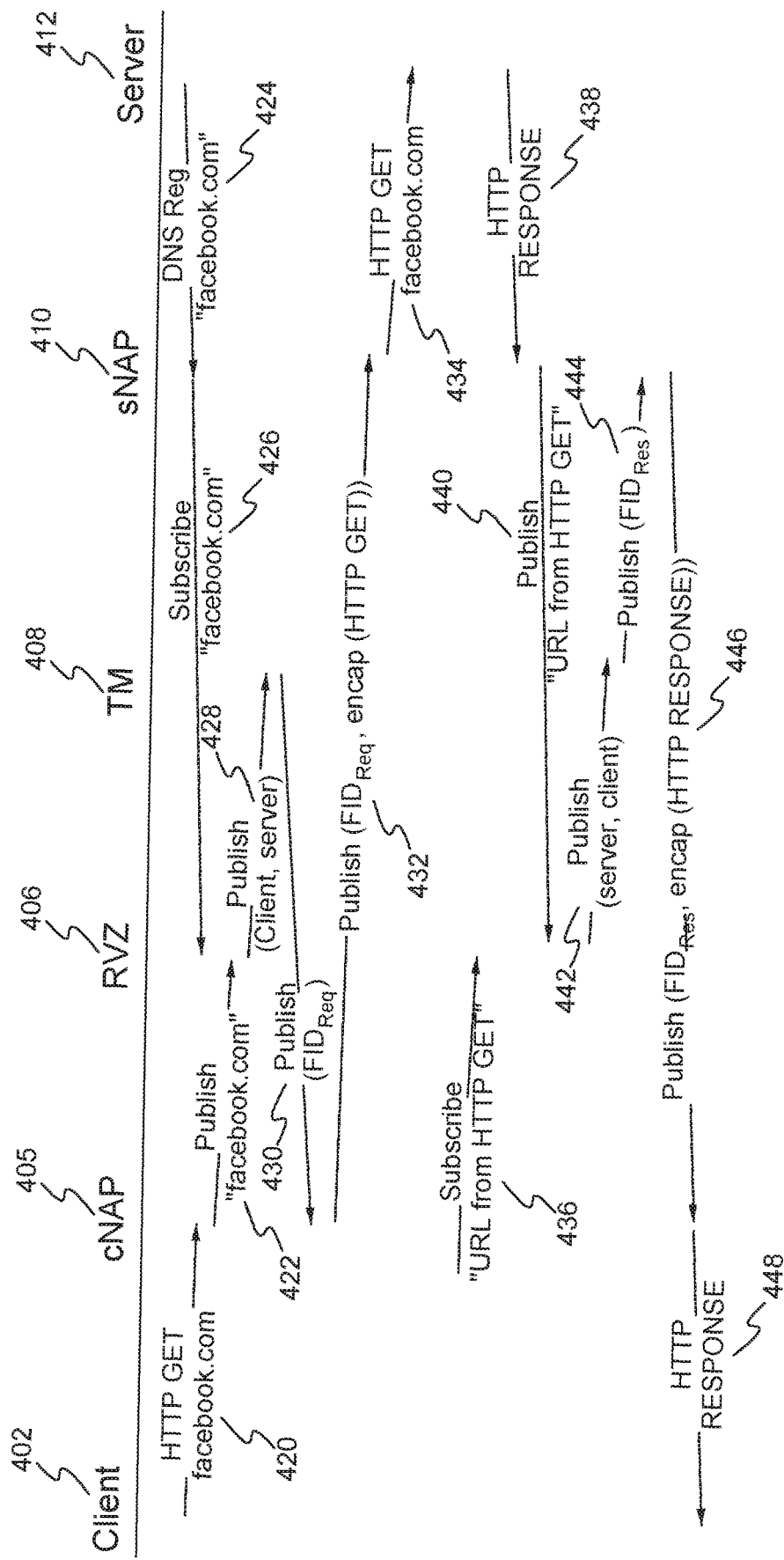
FIG. 4 is flowchart of a procedure for providing Hypertext Transfer Protocol (HTTP)-level services over an ICN network.

Referring now to FIG. 4, flowchart of a procedure for providing HTTP-level services over an ICN network is shown. The procedure may include mapping HTTP requests and HTTP response methods into appropriate ICN packets and publishing the ICN packets towards appropriate ICN names are shown. The mapping may be performed at a cNAP 405 of a client 402 and a sNAP 410 of a server 412.

The cNAP 405 may provide a standard IP network interface toward the client 402. In step 420, the client 402 may sent a HTTP request to the cNAP 405. In step 422, the cNAP 405 may encapsulate the received HTTP request into an appropriate ICN packet, and may publish the ICN packet as an appropriately formed named information item. In step 424, the sNAP 410 may receive a subscribing message from the server 412. In step 426, the sNAP 410 may subscribe to an information item by sending a message to a RVZ 406. In step 428, the RVZ 406 may send a publication message to a topology TM 420. In step 430, the TM 420 may then send a publication message to the cNAP 405. In step 432, the cNAP 405 may send a publication message to the sNAP 410. In step 434, the sNAP 410 may send a get message to the server 430. In step 436, the cNAP 405 may subscribe to any appropriately formed named information items, where the information identifier represents any HTTP-exposed service that is exposed at any IP-level device locally connected to the NAP.

In step 438, the server 430 may send a HTTP response to the sNAP 410. In step 440, the sNAP 410 may publish a message to the RVZ 406. In step 442, the RVZ 406 may publish a message to the TM 408. In step 444, the TM 408 may publish a message 422 to the sNAP 410. In step 446, the sNAP 410 may publish a response to the cNAP 405. In step 448, the cNAP 405 may send an HTTP response to the client 402. In summary, any received ICN packet is forwarded to the appropriate local IP device after being appropriately decapsulated, recovering the original HTTP request. Although not shown in FIG. 4, the mapping may also be performed at an ICN border GW for cases of HTTP methods being sent to and from peering networks.

Like in any HTTP service scenario, resources being requested from the client 402 at the server 412 are sometimes not available. For instance, an HTTP method might request the retrieval of an image from the server 412, but the image might not exist. This may lead to an HTTP error code 404 (e.g., "404 Not Found") being returned to the client 402. The error might be caused by misforming the request, for example, by requesting an image that never existed on the server 412 by mistyping the name or by misconfiguring the underlying Javascript operation. Other examples of errors that may be generated from the server include, but are not limited to, an HTTP 401 Error indicating access is denied due to invalid credentials and an HTTP 403 Error indicating the request was valid, but the server is refusing action. The methods described below may be used when any HTTP error message is received.

The ICN systems described above may provide support for service surrogate servers. The service surrogate servers may include one or more authoritative copies of the same server, which may be registered under the same fully qualified domain name (FQDN). In ICN implementations, a request from a client 402 may be routed to the nearest surrogate server as measured in path length. Other surrogate servers may not be utilized unless the originally used server fails. This may lead to a re-routing to another server, which is now the server nearest to the client.

An HTTP error code may mean that the resource is not available locally, which is semantically what one would expect when contacting a specific server. As described in additional detail below, this local unavailability may be interpreted only as a temporary result, as the request may be fulfilled at another surrogate service endpoint.

In the following examples, a content provider may provide community content. The content might be targeting specific cities at a regional or national level. In order to provide suitable Quality of Experience (QoE), the content provider may replicate its content server across the locality. This may shorten service latency and reduce bandwidth the content provider needs to purchase from an operator. The replication of the content server may be done instead of replicating the entirety of the content catalog, which may be costly and unnecessary if the content is consumed with high degree of locality (e.g., per city). The content server may be replicated as a surrogate service endpoint where each instance holds only locally relevant content. The overall catalog may be partitioned across the different instances. In this case, an error caused by an HTTP error may indicate the access of non-locally relevant content (e.g., a person in city A requesting content relevant to city B). However, a request at another server, in this case at the server holding content for city B, may yield a successful response.

The following examples provide a failover for HTTP requests to other surrogate service instances, either initiated from the cNAP or the sNAP. Although the signaling examples may refer to specific requests, such as GET, any HTTP request (e.g., GET or POST) may be supported. Furthermore, it should be noted that although the following examples are described in an HTTP context due to the required inspection of HTTP requests, the methods, systems, and apparatuses may also work with HTTPS-based services in the presence of one or more interception proxies that allow for the necessary exposure of HTTP at the NAPs. The requests described below may include one or more types of URLs, such as static object URLs pointing to media objects (e.g., image types such as PNG or JPEG files) or text files.

As shown in FIG. 4, the cNAP 405 may intercept the HTTP session, extract the method, publish it to the FQDN as extracted from the request URL, and subscribe to the response URL given in the request. The sNAP 410 that previously subscribed to the FQDN exposed by the server 412 may receive the publication of the cNAP 405 to the FQDN assuming the FQDN it subscribed to. The sNAP 410 may then extract the method, forward it locally to the server 412, and publish any response it receives back from the server 412 to the response URL. The response may be received at the cNAP 405, which may extract the response from the ICN message and relay it to the client 402.

As described above, a server may respond with an HTTP error message if the server does not hold the resources being requested at the HTTP level. In conventional systems, failover may be realized by the client, typically upon the display of a NOT FOUND message to the user. As described below, surrogate service instances may be used to find suitable responses transparent to the client.

Upon receiving an HTTP error response, a NAP may republish the original request, but may include a new ICN message. The new ICN message may include an exclusion list. The exclusion list may include one or more node identifiers (NIDs) used by the RVZ to match possible publishers and subscribers. The one or more NIDs included in the ICN message may be those of server-facing NAPs that have already been previously contacted in the ongoing request-response transaction. One or more tables in the NAP may associate HTTP requests with the one or more NIDs. The one or more NIDs may be provided by a method known as publish_isub( ) in which a NAP publishes its own NID information as well as its subscription information directly to another NAP. The publish_isub( ) method may allow the NAP to avoid going through the RV to match a new subscription with the publication of a response, since it may already know that that a match exists. In the HTTP case, the recipient of the publish_isub( ) knows what to send (the HTTP response) and who to send it to (the sender of the HTTP get message). This may eliminate the need for a NAP to send an addition publish message when receiving an HTTP response. When the HTTP response is received, it may be sent directly to the appropriate node through the stored NID information without requiring the RV to make a match.

Furthermore the one or more NIDs may be mapped to one or more forwarding identifiers (FIDs), which may be path identifiers that encode paths towards the one or more NIDs. The selection of the most suitable server candidate, for example, a server subscribed to the FQDN specified in the request, may be done in the TM. The TM may receive the exclusion list from the RV as in the publication. The selection of the most suitable server candidate may be based on the removal of NIDs that are included in the exclusion list and then selecting a NID having the shortest path to the publisher. Alternatively, other selection policies than shortest path, for example, lowest cost, lowest latency, may be used, as long as the preselection through the exclusion list is preserved.

Upon selecting the appropriate path, the information may be delivered back to the publisher, for example, the NAP performing the failover procedure, and the procedures described above with reference to FIG. 4 may be executed. If the chosen server does not hold the resource, the procedure may be repeated after the exclusion list has been updated to include the NID of the chosen servers NAP. If the response is positive and the content is present in the chosen server, the content may be delivered to the NAP that performed the failover procedure.

Figure 5:
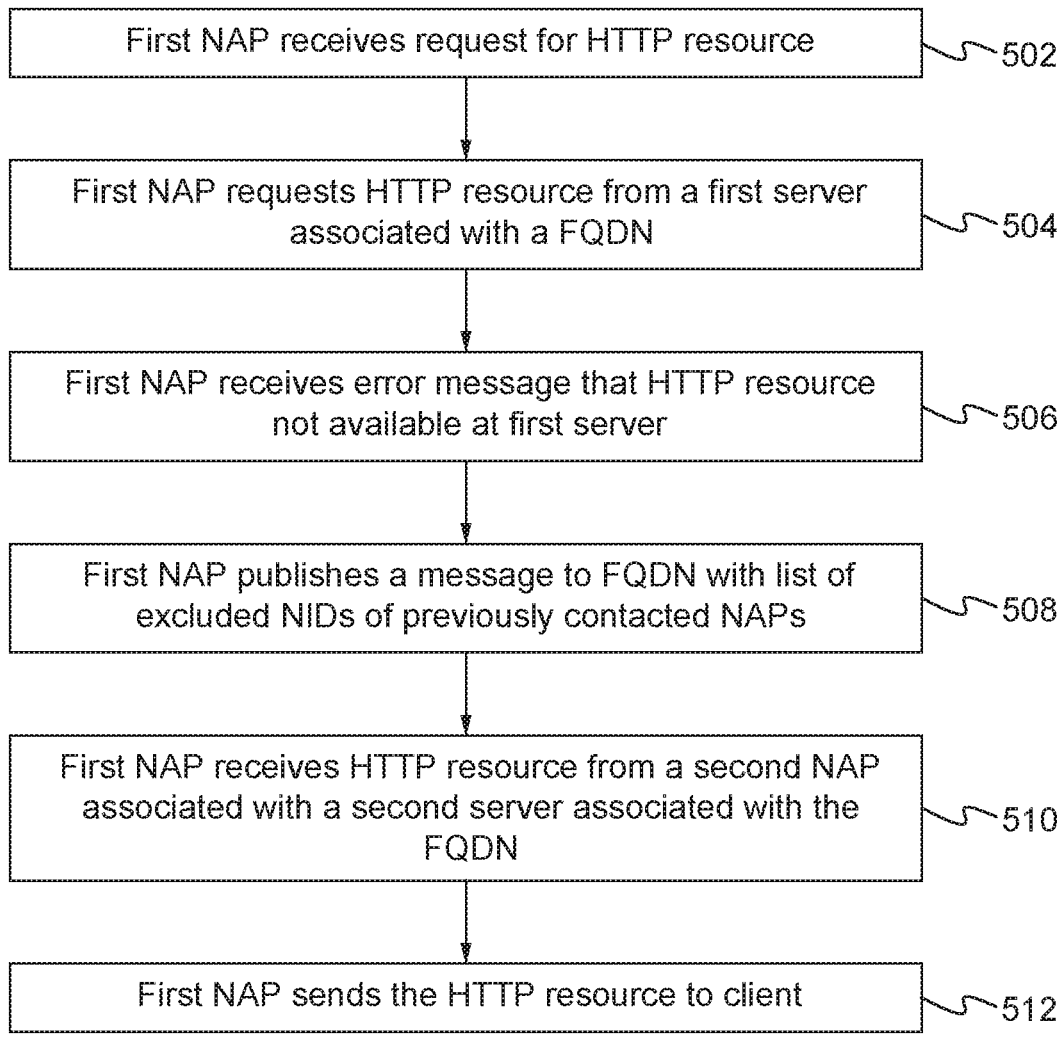
FIG. 5 is a flowchart illustrating a failover procedure performed by a network access point (NAP)

Referring now to FIG. 5, a flowchart illustrating a failover procedure performed by a NAP is shown. As described above, a client may submit a request for an HTTP resource. In step 502, a first NAP may receive the request for the HTTP resource. In step 504, the first NAP may request the HTTP resource from a first server associated with a FQDN specified in the request for the HTTP resource. In step 506, the first NAP may receive an error message that the HTTP resource is not available from the first server. In step 508, the first NAP may publish a message to the FQDN. The message may include a list of excluded NIDs of one or more NAPs that have been previously contacted and have not provided the HTTP resource. The list of excluded NIDs may include a NID of the first server itself. As described above, the list of excluded NIDs may be used to match publishers and subscribers to the FQDN and select a nearest subscriber NAP having a NID that is not on the list of excluded NIDs.

In step 510, the first NAP may receive the HTTP resource from a second NAP associated with a second server that is associated with the FQDN. The NID of the second server may not be on the list of excluded NIDs. In step 512, the first NAP may send the received HTTP resource to the client that originally requested it.

Figure 6:
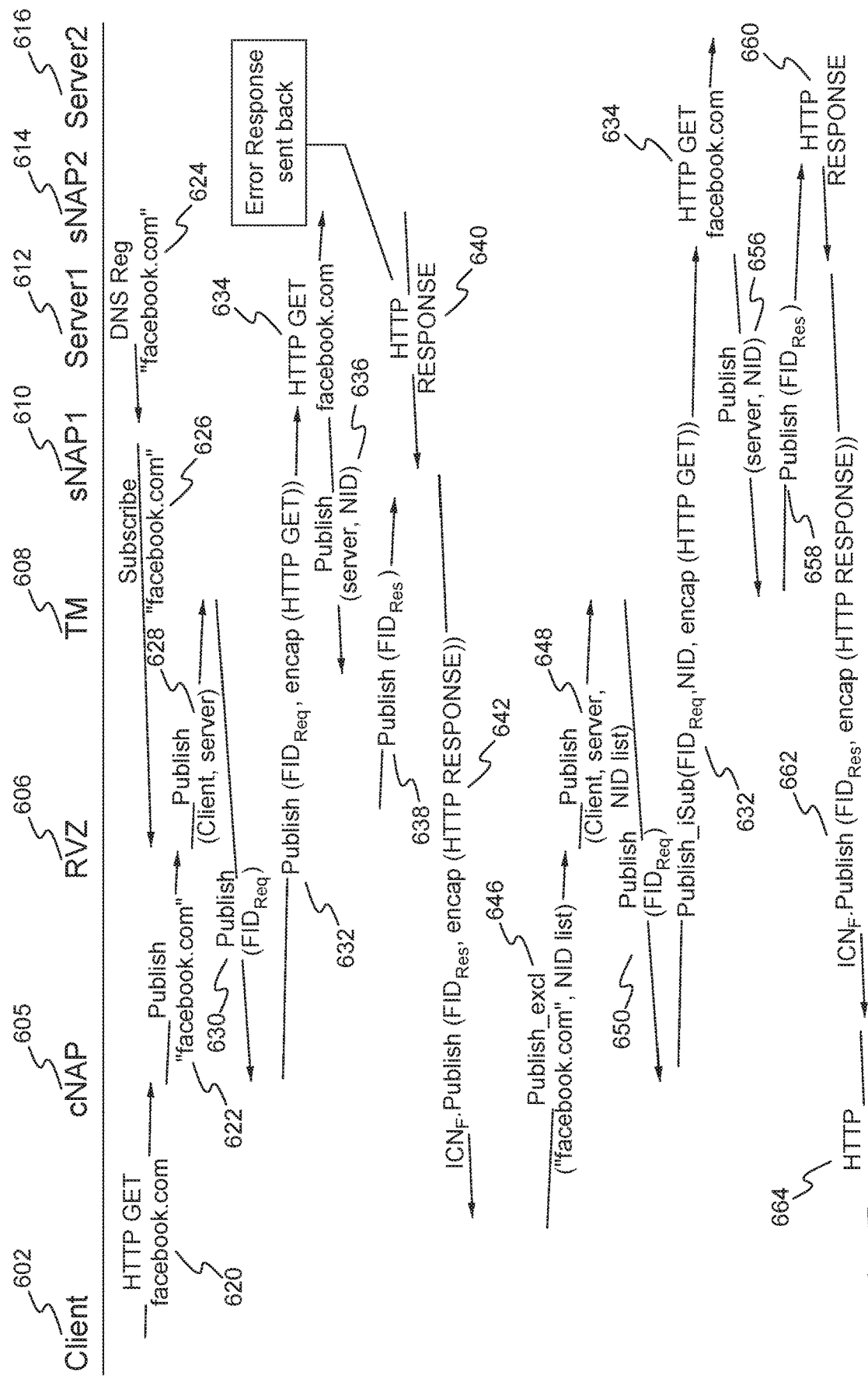
FIG. 6 is a flowchart illustrating a failover procedure initiated by a client NAP (cNAP)

Referring now to FIG. 6, a flowchart illustrating a failover procedure initiated by a cNAP is shown. The cNAP 605 may provide a standard IP network interface toward a client 602. In step 620, the client 602 may send a HTTP request to the cNAP 605. In step 622, the cNAP 605 may encapsulate the received HTTP request into an appropriate ICN packet, and may publish the ICN packet as an appropriately formed named information item. In step 624, a first sNAP 610 may receive a subscribing message from a first server 612. In step 626, the first sNAP 610 may subscribe to an information item by sending a message to a RVZ 606. In step 628, the RVZ 606 may send a publication message to a TM 620. In step 630, the TM 620 may then send a publication message to the cNAP 605. In step 632, the cNAP 605 may send a publication message to the first sNAP 610. In step 634, the first sNAP 610 may send a get message to the first server 630. In step 636, the first sNAP 610 may also send a publish message to the TM 608 that includes a NID of the cNAP 605 and the NID of the first sNAP 610, indicated as 'server' in step 636. Upon arrival of the message sent in step 636, the TM calculates the shortest path (or any other constrained-based path) between the cNAP 605 and the sNAP 610, this path represented as a path identifier information. In step 638, the TM 608 may send a publish message to the first sNAP 610, returning the path identifier information calculated in the previous step 636. The path identifier information is stored locally to avoid future execution of steps 656 and 658 in case of the same cNAP and sNAP information being provided.

In step 640, the first server 612 may send a HTTP response to the first sNAP 610. As described above, the HTTP response may be an HTTP error. In step 642, the first sNAP 610 may publish the HTTP error message to the cNAP 605. The cNAP 605 may examine the HTTP error message received from the first sNAP 610 and may initiate a failover.

In step 644, the cNAP 605 may create a new ICN message called publish_excl( ) and send it to the RVZ 606. The publish_excl( ) message may include the parameters of the publish( ) message sent in step 622 and a list of all NIDs that have previously replied to the original request. For example, the list may include the NID of the first sNAP 610 that sent the HTTP error message in step 642.

In step 648, the RVZ 606 may provide the parameters and the exclusion list to the TM 608. The TM 608 may eliminate all sNAPs with NIDs on the exclusion list and may select the nearest subscriber sNAP. It should be noted that "nearest" may mean shortest topological path, shortest geographic distance, or any other configured metric by which sNAPs are ranked. As shown in FIG. 6, the newly selected sNAP may be the second sNAP 614 associated with a second server 616.

In step 650, the TM 608 may send a new FIDreq to the cNAP 605 containing information about the second sNAP 614. In step 652, the cNAP 605 may send a publication message to the second sNAP 614. In step 654, the second sNAP 614 may send a get message to the second server 616. In step 656, the second sNAP 614 may also send a publish message to the TM 608 that includes a NID of the second sNAP 614 as well as the NID of the cNAP 605, initiating a path computation between both NIDs similar to step 636. In step 658, the TM 608 may send a publish message to the second sNAP 614 containing the path identifier information calculated in the previous step 656. The path identifier information is stored locally to avoid future execution of step 656 and 658 in case of the same cNAP and sNAP information being provided.

In step 660, the second server 616 may send a HTTP response to the second sNAP 614. In step 662, the second sNAP 614 may publish a response to the cNAP 605 with a FID indicating a path that was calculated in step 656 and returned to the second sNAP in step 658. This may allow the cNAP 605 to send future HTTP requests directly to the second sNAP 614 by utilizing said FID delivered. In step 664, the cNAP 605 may send an HTTP response to the client 602. In summary, any received ICN packet is forwarded to the appropriate local IP device after being appropriately decapsulated, recovering the original HTTP request.

As shown in FIG. 6, if the result from the second sNAP 614 is positive, the result is delivered to the client 602. If the second sNAP 614 also returns an HTTP error, the procedure may continue with the cNAP 605 creating a new ICN message with the NID of the second sNAP 614 added to the exclusion list.

It should be noted that this loop may not lead to a suitable response to the HTTP request in step 620 if all possible FQDN surrogate choices are exhausted. In other words, the publication of the exclusion list might not yield any possible subscribers if all choices have returned an HTTP error. This situation may be handled by a timeout at the ICN transport level. A transport protocol for the reliable transfer of ICN messages may be used to eventually time out and exit the loop. Although not shown in FIG. 6, the mapping may also be performed at an ICN border GW for cases of HTTP methods being sent to and from peering networks.

Figure 7:
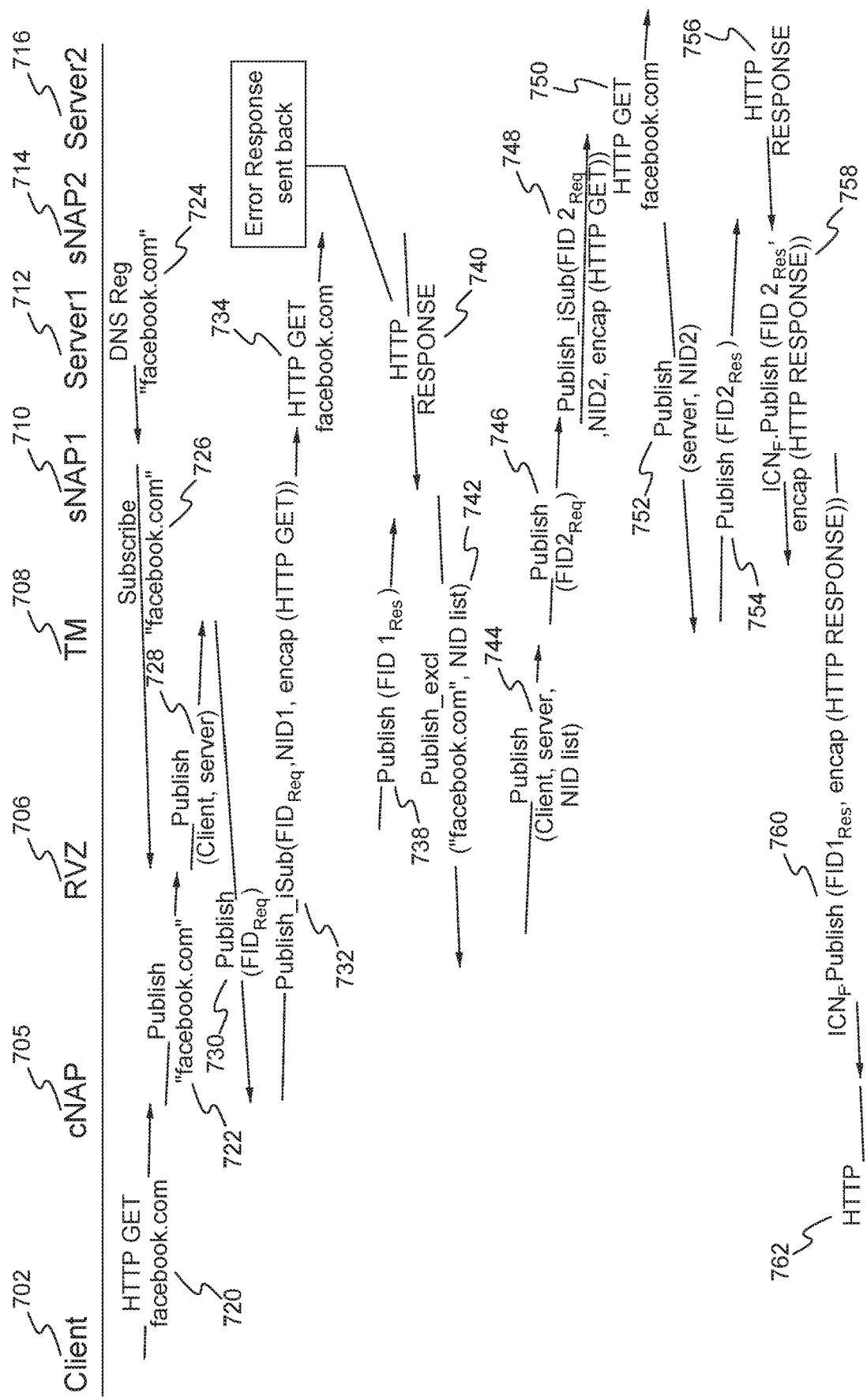
FIG. 7 is a flowchart illustrating a failover procedure initiated by a server NAP (sNAP)

Referring now to FIG. 7, a flowchart illustrating a failover procedure initiated by a sNAP is shown. A cNAP 705 may provide a standard IP network interface toward a client 702. In step 720, the client 702 may send a HTTP request to the cNAP 705. In step 722, the cNAP 705 may encapsulate the received HTTP request into an appropriate ICN packet, and may publish the ICN packet as an appropriately formed named information item. In step 724, a first sNAP 710 may receive a subscribing message from a first server 712. In step 726, the first sNAP 710 may subscribe to an information item by sending a message to a RVZ 706. In step 728, the RVZ 706 may send a publication message to a TM 720. In step 730, the TM 720 may then send a publication message to the cNAP 705. In step 732, the cNAP 705 may send a publication message to the first sNAP 710. In step 734, the first sNAP 710 may send a get message to the first server 730. In step 736, the first sNAP 710 may also send a publish message to the TM 708 that includes a NID of the first sNAP 710. In step 738, the TM 708 may send a publish message to the first sNAP 710.

In step 740, the first server 712 may send a HTTP response to the first sNAP 710. As described above, the HTTP response may be an HTTP error. The first sNAP 710 may examine the HTTP error message received from the first server 612 and may initiate a failover.

The first sNAP 710 may create a new ICN message called publish_excl( ) and send it to the RVZ 706. The publish_excl( ) message may include the parameters of the publish( ) message sent in step 722 and a list of all NIDs that have previously replied to the original request. For example, the list may include the NID of the first sNAP 710 that received the HTTP error message in step 740.

In step 744, the RVZ 706 may provide the parameters and the exclusion list to the TM 708. The TM 708 may eliminate all sNAPs with NIDs on the exclusion list and may select the nearest subscriber sNAP. It should be noted that "nearest" may mean shortest topological path, shortest geographic distance, or any other configured metric by which sNAPs are ranked. As shown in FIG. 7, the newly selected sNAP may be the second sNAP 714 associated with a second server 716.

In step 746, the TM 608 may send a new FIDreq to the first sNAP 710 containing information about the second sNAP 714. In step 748, the first sNAP 710 may send a publication message to the second sNAP 714. In step 750, the second sNAP 714 may send a get message to the second server 716. In step 752, the second sNAP 714 may also send a publish message to the TM 708 that includes a NID of the second sNAP 714. In step 754, the TM 708 may send a publish message to the second sNAP 714.

In step 756, the second server 716 may send a HTTP response to the second sNAP 714. In step 758, the second sNAP 714 may publish a response to the first sNAP 710. In step 760, the first sNAP 710 may send the HTTP response to the cNAP 705 605 with a FID indicating a path that generated the positive HTTP response. This may allow the cNAP 705 to send future HTTP requests directly to the second sNAP 714. In step 762, the cNAP 705 may send the HTTP response to the client 702. In summary, any received ICN packet is forwarded to the appropriate local IP device after being appropriately decapsulated, recovering the original HTTP request.

As shown in FIG. 7, if the result from the second server 716 is positive, the result is delivered to the client 702. If the second server 716 also returns an HTTP error, the procedure may continue with the first sNAP 710 creating a new ICN message with the NID of the second sNAP 714 added to the exclusion list.

It should be noted that this loop may not lead to a suitable response to the HTTP request in step 720 if all possible FQDN surrogate choices are exhausted. In other words, the publication of the exclusion list might not yield any possible subscribers if all choices have returned an HTTP error. This situation may be handled by a timeout at the ICN transport level. A transport protocol for the reliable transfer of ICN messages may be used to eventually time out and exit the loop. Although not shown in FIG. 7, the mapping may also be performed at an ICN border GW for cases of HTTP methods being sent to and from peering networks.

The procedure described above may return a positive result along the path of the failover requests. In other words, the response may 'hop back' as in breadcrumb routing, from one sNAP to another until it reaches the originally contacted first sNAP 710. It is the first sNAP 710 that ultimately replies to the cNAP 705. This may result in additional latency as compared to delivering the HTTP response to the cNAP 705 directly from the positively responding sNAP, in this case the second sNAP 714.

Figure 8:
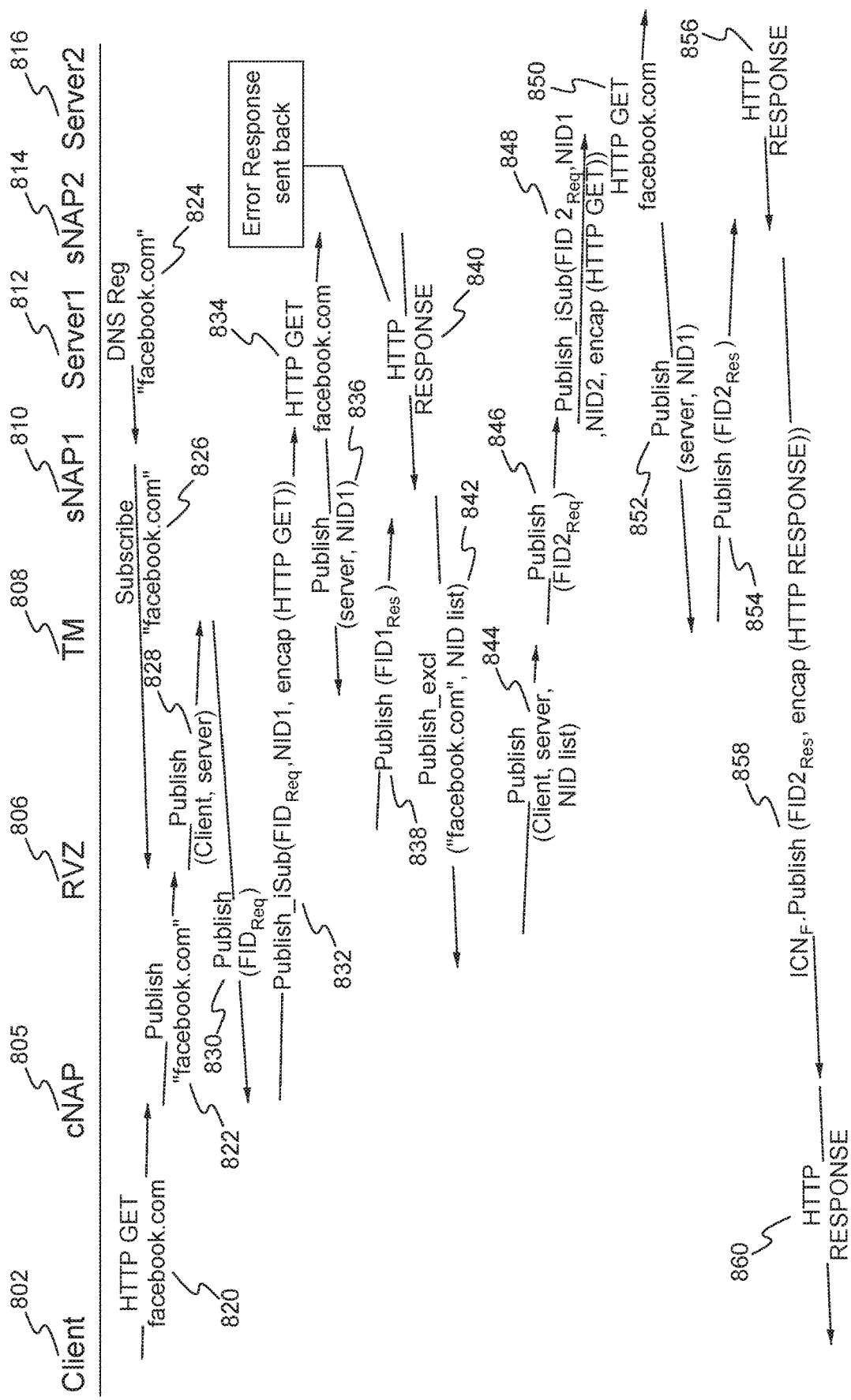
FIG. 8 is a flowchart illustrating a failover procedure initiated by a sNAP with direct delivery to a cNAP.

Referring now to FIG. 8, a flowchart illustrating a failover procedure initiated by a sNAP with direct delivery to a cNAP is shown. A cNAP 805 may provide a standard IP network interface toward the client 802. In step 820, the client 802 may send a HTTP request to the cNAP 805. In step 822, the cNAP 805 may encapsulate the received HTTP request into an appropriate ICN packet, and may publish the ICN packet as an appropriately formed named information item. In step 824, a first sNAP 810 may receive a subscribing message from a first server 812. In step 826, the first sNAP 810 may subscribe to an information item by sending a message to a RVZ 806. In step 828, the RVZ 806 may send a publication message to a TM 820. In step 830, the TM 820 may then send a publication message to the cNAP 805. In step 832, the cNAP 805 may send a publication message to the first sNAP 810. In step 834, the first sNAP 810 may send a get message to the first server 830. In step 836, the first sNAP 810 may also send a publish message to the TM 808 that includes a NID of the first sNAP 810. In step 838, the TM 808 may send a publish message to the first sNAP 810.

In step 840, the first server 812 may send a HTTP response to the first sNAP 810. As described above, the HTTP response may be an HTTP error. The first sNAP 810 may examine the HTTP error message received from the first server 612 and may initiate a failover.

The first sNAP 810 may create a publish_excl( ) and send it to the RVZ 806. The publish_excl( ) message may include the parameters of the publish( ) message sent in step 822 and a list of all NIDs that have previously replied to the original request. For example, the list may include the NID of the first sNAP 810 that received the HTTP error message in step 840.

In step 844, the RVZ 806 may provide the parameters and the exclusion list to the TM 808. The TM 808 may eliminate all sNAPs with NIDs on the exclusion list and may select the nearest subscriber sNAP. It should be noted that "nearest" may mean shortest topological path, shortest geographic distance, or any other configured metric by which sNAPs are ranked. As shown in FIG. 8, the newly selected sNAP may be the second sNAP 814 associated with a second server 816.

In step 846, the TM 608 may send a new FIDreq to the first sNAP 810 containing information about the second sNAP 814. In step 848, the first sNAP 810 may send a publication message to the second sNAP 814. The publication message may include a pub_isub( ) message that may be extended to include not only the NID of the currently requested second sNAP 814, but also the NID for the originally requested first sNAP 810 and any sNAPs in between. This message extension may be handled through optional header fields in the specification of the pub_isub( ) messages. With this additional information, the NID of the first sNAP 810 may be utilized for the calculation of the return path. Additionally or alternatively, a node-local NID-FID cache may be used instead of the NID of the second sNAP 814, allowing for the final result to be directly returned to the client 802 rather than 'hopping back' along the entire path of previously contacted sNAPs.

In step 850, the second sNAP 814 may send a get message to the second server 816. In step 852, the second sNAP 814 may also send a publish message to the TM 808 that includes a NID of the second sNAP 814. In step 854, the TM 808 may send a publish message to the second sNAP 814.

In step 856, the second server 816 may send a HTTP response to the second sNAP 814. In step 858, the second sNAP 814 may publish a response to the cNAP 805 with a FID indicating a path that generated the positive HTTP response. This may allow the cNAP 805 to send future HTTP requests for the directly to the second sNAP 814. In step 862, the cNAP 805 may send the HTTP response to the client 802. In summary, any received ICN packet is forwarded to the appropriate local IP device after being appropriately decapsulated, recovering the original HTTP request.

As shown in FIG. 8, if the result from the second server 816 is positive, the result is delivered to the client 802. If the second server 816 also returns an HTTP error, the procedure may continue with the first sNAP 810 creating a new ICN message with the NID of the second sNAP 814 added to the exclusion list.

It should be noted that this loop may not lead to a suitable response to the HTTP request in step 820 if all possible FQDN surrogate choices are exhausted. In other words, the publication of the exclusion list might not yield any possible subscribers if all choices have returned an HTTP error. This situation may be handled by a timeout at the ICN transport level. A transport protocol for the reliable transfer of ICN messages may be used to eventually time out and exit the loop. Although not shown in FIG. 8, the mapping may also be performed at an ICN border GW for cases of HTTP methods being sent to and from peering networks.

From a scalability perspective, the disclosed failure redirections may only require keeping track of redirected requests through an internal table that keeps request-specific parameters (e.g., the request URL and other request parameters) together with NID information on the requesting client or the sNAP that redirected the request. Logging this information may not require much memory. The actual message body of requests (e.g., a HTTP POST request) may not need to be stored since the actual body is forwarded to an alternative sNAP and may be removed from memory.

The additional messages described herein, including the additional node identifier in the new publish_isub( ) message and the new publish_excl( ) message, may be included in the PURSUIT protocol. The reception of these new messages at the NAPs and RVZ may initiate the steps outlined herein.

In an example, an internal table of node identifiers and path/forwarding information may exist, removing the need to compute suitable forwarding information with every incoming request. This may reduce signaling delay.

The disclosed systems, methods, and apparatuses may provide a failover to alternative HTTP sources in case of an error response within communication between two IP-only devices at the HTTP level. One IP-only device may be connected to an ICN network while the other IP-only device may be connected to either the ICN network or an IP network. An ICN NAP may forward an original HTTP request to an alternative NAP associated with an alternative HTTP server based on a list of excluded NIDs. The list of excluded NIDs may identify one or more NAPs associated with one or more servers that previously produced an error message when attempting to retrieve content from the one or more servers. A NID of the alternative NAP may not be included on the list of excluded NIDs Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use by in a first network access point (NAP) in an Information Centric Network (ICN), the method comprising:
   receiving a request for a Hypertext Transfer Protocol (HTTP) resource from a requestor, wherein the request for the HTTP resource comprises a fully qualified domain name (FQDN);
   requesting the HTTP resource from a first server associated with the FQDN;
   receiving an error message that the HTTP resource is not available from the first server;
   publishing a message to a rendezvous point (RVZ), the message comprising a list of excluded node identifiers (NIDs) of one or more NAPs that have been previously contacted and have not provided the HTTP resource;
   receiving a forwarding identifier (FID) of a second NAP from a topology manager (TM), wherein the second NAP is associated with a second server that is associated with the FQDN, and wherein a NID of the second NAP is not on the list of excluded NIDs;
   requesting the HTTP resource from the second NAP;
   receiving the HTTP resource from the second NAP; and
   sending the HTTP resource to the requestor.

2. The method of claim 1, wherein the first NAP comprises a client NAP (cNAP).

3. The method of claim 1, wherein the first NAP comprises a server NAP (sNAP).

4. The method of claim 1, wherein the second NAP comprises a server NAP (sNAP).

5. The method of claim 1, wherein the requestor comprises a client.

6. The method of claim 1, wherein the requestor comprises a client NAP (cNAP).

7. The method of claim 6, wherein the HTTP resource is forwarded to a client by the cNAP.

8. The method of claim 6, further comprising:
   sending the FID of the second NAP to the cNAP.

9. The method of claim 1, wherein the second NAP is one NAP of a plurality of NAPs associated with the FQDN.

10. The method of claim 9, wherein the second NAP is geographically closer to the first NAP than a remainder of the plurality of NAPs.

11. The method of claim 9, wherein the second NAP is topographically closer to the first NAP than a remainder of the plurality of NAPs.

12. A first network access point (NAP) in an Information Centric Network (ICN) comprising:
   a communications interface; and
   a processor operatively coupled to the communications interface, the processor and the communications interface configured to receive a request for a Hypertext Transfer Protocol (HTTP) resource from a requestor, wherein the request for the HTTP resource comprises a fully qualified domain name (FQDN);
   the processor and the communications interface further configured to request the HTTP resource from a first server associated with the FQDN;
   the processor and the communications interface further configured to receive an error message that the HTTP resource is not available from the first server;
   the processor and the communications interface further configured to publish a message to a rendezvous point (RVZ), the message comprising a list of excluded node identifiers (NIDs) of one or more NAPs that have been previously contacted and have not provided the HTTP resource;
   the processor and the communications interface further configured to receive a forwarding identifier (FID) of a second NAP from a topology manager (TM), wherein the second NAP is associated with a second server that is associated with the FQDN, and wherein a NID of the second NAP is not on the list of excluded NIDs;
   the processor and the communications interface further configured to request the HTTP resource from the second NAP;
   the processor and the communications interface further configured to receive the HTTP resource from the second NAP; and
   the processor and the communications interface further configured to send the HTTP resource to the requestor.

13. The first NAP of claim 12, wherein the second NAP comprises a server NAP (sNAP).

14. The first NAP of claim 12, wherein the requestor comprises a client.

15. The first NAP of claim 12, wherein the requestor comprises a cNAP.

16. The first NAP of claim 15, wherein the HTTP resource is forwarded to a client by the cNAP.

17. The first NAP of claim 15, wherein the processor and the communications interface are further configured to send the FID of the second NAP to the cNAP.

18. The first NAP of claim 12, wherein the second NAP is one NAP of a plurality of NAPs associated with the FQDN.

19. The first NAP of claim 18, wherein the second NAP is geographically closer to the first NAP than a remainder of the plurality of NAPs.

20. The first NAP of claim 18, wherein the second NAP is topographically closer to the first NAP than a remainder of the plurality of NAPs.

\* \* \* \* \*